(12) United States Patent
Xu et al.

(10) Patent No.: US 11,683,501 B2
(45) Date of Patent: Jun. 20, 2023

(54) METHOD AND APPARATUS FOR VIDEO CODING

(71) Applicant: Tencent America LLC, Palo Alto, CA (US)

(72) Inventors: Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 44 days.

(21) Appl. No.: 16/743,512

(22) Filed: Jan. 15, 2020

(65) Prior Publication Data

US 2020/0236366 A1 Jul. 23, 2020

Related U.S. Application Data

(60) Provisional application No. 62/793,874, filed on Jan. 17, 2019.

(51) Int. Cl.
*H04N 19/159* (2014.01)
*H04N 19/174* (2014.01)
(Continued)

(52) U.S. Cl.
CPC ......... *H04N 19/159* (2014.11); *H04N 19/174* (2014.11); *H04N 19/176* (2014.11); *H04N 19/91* (2014.11)

(58) Field of Classification Search
CPC .... H04N 19/159; H04N 19/91; H04N 19/174; H04N 19/176; H04N 19/52; H04N 19/593; H04N 19/70
See application file for complete search history.

(56) References Cited

U.S. PATENT DOCUMENTS

2002/0118758 A1 8/2002 Sekiguchi et al.
2005/0281334 A1 12/2005 Walker et al.
(Continued)

FOREIGN PATENT DOCUMENTS

WO 2015180014 A1 12/2015

OTHER PUBLICATIONS

International Search Report and Written Opinion dated Apr. 17, 2020 in International Application No. PCT/US2020/014042, 18 pages.
(Continued)

*Primary Examiner* — Joseph W Becker
(74) *Attorney, Agent, or Firm* — Arentfox Schiff LLP

(57) ABSTRACT

Aspects of the disclosure provide methods and apparatuses for video encoding/decoding. In some examples, an apparatus for video decoding includes processing circuitry. The processing circuitry can decode first prediction information of a current region in a current picture and second prediction information of a current block in the current region from a coded video bitstream. The second prediction information indicates that a prediction mode for reconstructing the current block is one of: an inter prediction mode and an intra block copy (IBC) mode. The processing circuitry can determine a first set of default vectors for the current region based on the first prediction information. The processing circuitry can add a vector from the first set of default vectors to a candidate list for the current block and reconstruct at least one sample in the current block based on the updated candidate list.

19 Claims, 17 Drawing Sheets

(51) Int. Cl.
*H04N 19/176* (2014.01)
*H04N 19/91* (2014.01)

(56) References Cited

U.S. PATENT DOCUMENTS

| | | |
|---|---|---|
| 2011/0194609 A1 | 8/2011 | Rusert et al. |
| 2014/0301465 A1 | 10/2014 | Kwon et al. |
| 2015/0222904 A1 | 8/2015 | Zhou |
| 2016/0105670 A1 | 4/2016 | Pang et al. |
| 2017/0099495 A1 | 4/2017 | Rapaka et al. |
| 2017/0180749 A1 | 6/2017 | Sugio et al. |
| 2019/0297325 A1* | 9/2019 | Lim .................. H04N 19/513 |
| 2020/0177908 A1* | 6/2020 | Lee .................... H04N 19/513 |
| 2021/0136400 A1* | 5/2021 | Chen ................. H04N 19/513 |

OTHER PUBLICATIONS

Xu et al. "Overview of the emerging HEVC screen content coding extension." In: IEEE Transactions on Circuits and Systems for Video Technology. Sep. 2015 (Sep. 2015).

Supplementary European Search Report dated Aug. 18, 2022 in Application No. 20741702.3, pp. 1-11.

Nam J, et al: "Non-CE8: Block vector predictor for IBC", 12. JVET Meeting; Oct. 3, 2018-Oct. 12, 2018; Macao; (The Joint Video Exploration Team of ISO/IEC JTC1/SC29/WG11 and ITU-T SG. 16 ), No. L0159-r1; JVET-L0159, Oct. 6, 2018, pp. 1-3.

Nam J, et al: "CE8-related: Default candidates for IBC merge mode", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET-N0460, Mar. 13, 2019, pp. 1-3.

Chen X, et al: "CE 4: Merge Offset Extension (Test 4.4.8)", 12. JVET Meeting; Oct. 3, 2018-Oct. 12, 2018; Macao; (The Joint Video Exploration Team of ISO/IEC JTC1/SC29/WG11 and ITU-T SG.16 ), No. JVET-L0176, Oct. 6, 2018, pp. 1-6.

An J, et al: "Enhanced Merge Mode based on JEM7.0", 10. JVET Meeting; Apr. 10, 2018-Apr. 20, 2018; San Diego; (The Joint Video Exploration Team of ISO/IEC JTC1/SC29/WG11 and ITU-T SG.16), No. JVET-J0059, Apr. 15, 2018, pp. 1-14.

* cited by examiner

METHOD AND APPARATUS FOR VIDEO CODING

INCORPORATION BY REFERENCE

This present application claims the benefit of priority to U.S. Provisional Application No. 62/793,874, "Default Block Vector Prediction for Intra Picture Block Compensation" filed on Jan. 17, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge".

Referring to FIG. 1C, a current block (151) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (152 through 156, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode first prediction information of a current region in a current picture and second prediction information of a current block in the current region from a coded video bitstream. The second prediction information indicates that a prediction mode for reconstructing the current block is one of: an inter prediction mode and an intra block copy (IBC) mode. The processing circuitry can determine a first set of default vectors for the current region based on the first prediction information. The processing circuitry can add a vector from the first set of default vectors to a candidate list for the current block and reconstruct at least one sample in the current block based on the updated candidate list.

In an embodiment, the processing circuitry can determine a number of candidates in the candidate list and add the vector from the first set of default vectors to the candidate list when the number of candidates is less than a threshold.

In an embodiment, the current region is one of: a slice, a tile, a tile group, and the current picture. The first prediction information is signaled in a header. The header can be one of: a slice header, a tile header, a tile group header, and a picture header.

In an embodiment, the first prediction information includes the first set of default vectors.

In an embodiment, the first prediction information includes indices pointing to first vectors in a set of vectors.

The processing circuitry can determine the first vectors to be the first set of default vectors.

In an embodiment, the processing circuitry can obtain a second set of default vectors for a previously reconstructed region and determine the first set of default vectors for the current region based on the second set of default vectors and the first prediction information. In an example, the first prediction information includes at least one index and at least one new vector to replace at least one of the second set of default vectors. The at least one index indicates the at least one of the second set of default vectors to be replaced. The processing circuitry can replace the at least one of the second set of default vectors with the at least one new vector to form the first set of default vectors.

In an embodiment, the processing circuitry can add the vector from the first set of default vectors to a last entry in the candidate list.

In an embodiment, prior to adding the vector, the processing circuitry determines whether at least one candidate in the candidate list is invalid for the current block. When the at least one candidate in the candidate list is determined to be invalid, the processing circuitry removes the at least one candidate from the candidate list to prune the candidate list and add the vector from the first set of default vectors to a last entry in the pruned candidate list.

In an embodiment, the vector is a block vector and the prediction mode is the IBC mode.

Aspects of the disclosure provide methods and apparatuses for video encoding/decoding. In some examples, an apparatus for video decoding includes processing circuitry. The processing circuitry can decode prediction information of a current block in a current picture from a coded video bitstream where the prediction information indicates that a prediction mode for reconstructing the current block is one of: an inter prediction mode and an intra block copy (IBC) mode. The processing circuitry selects a candidate from a candidate list for the current block as a base vector and selects an offset vector from a set of offset vectors. The processing circuitry determines a vector from the base vector and the offset vector and adds the vector to the candidate list. Further, the processing circuitry reconstructs at least one sample in the current block based on the candidate list after the vector is added to the candidate list. In an example, the set of offset vectors is one of: a first set of (+1, 0), (−1, 0), (0, +1), and (0, −1) and a second set of (+2, 0), (−2, 0), (0, +2), and (0, −2).

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
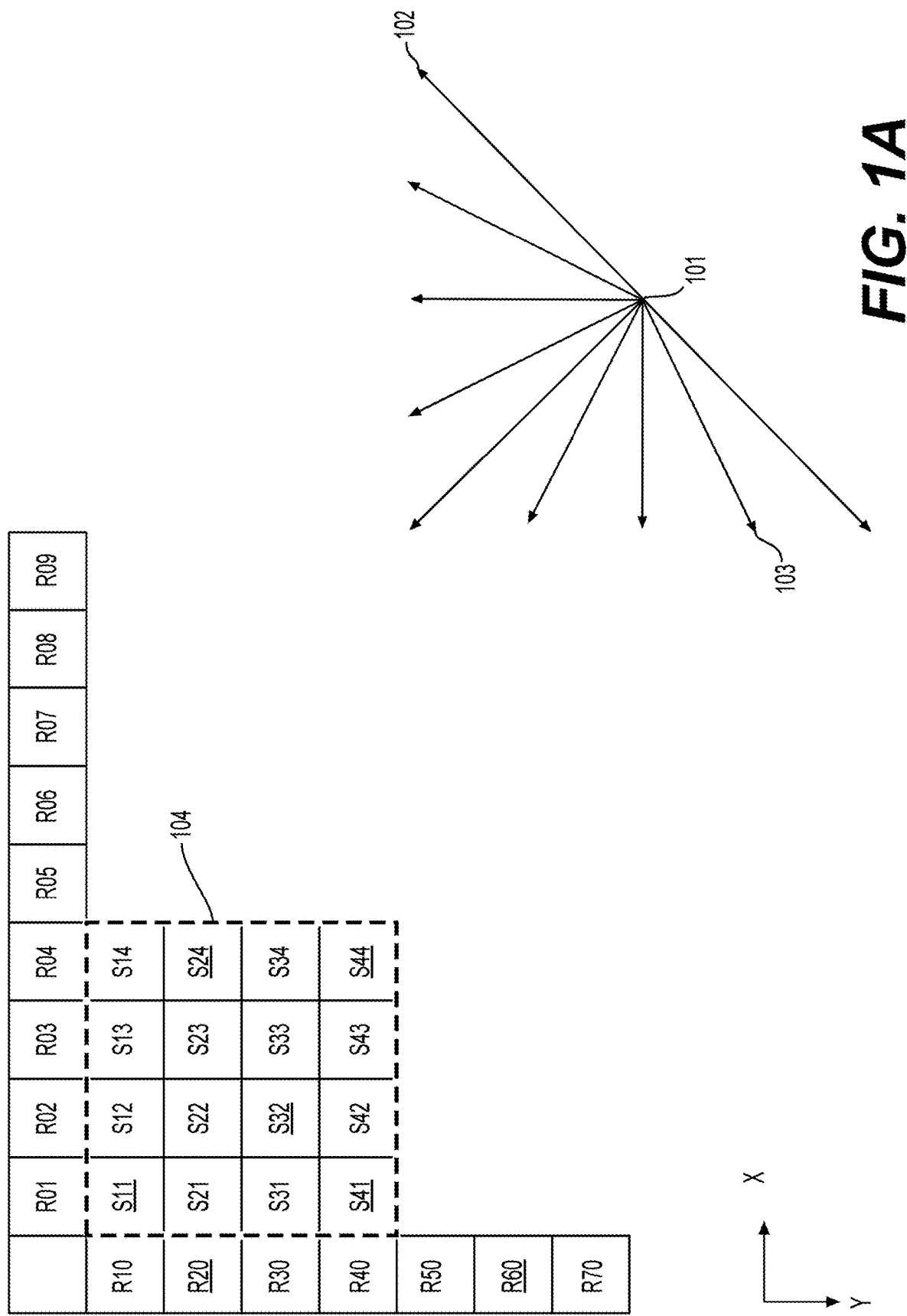
FIG. 1A is a schematic illustration of an exemplary subset of intra prediction modes.
Figure 1B:
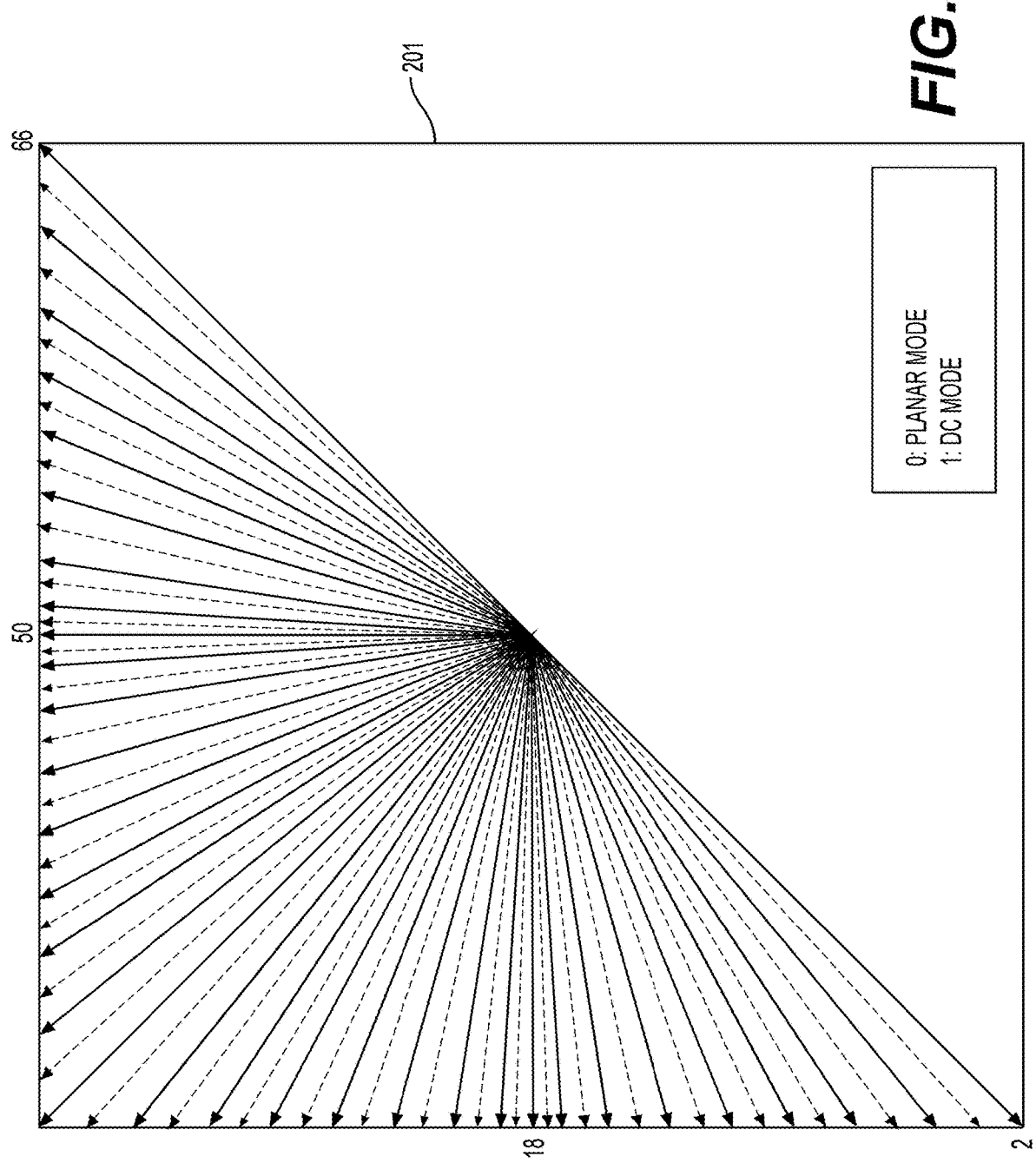
FIG. 1B is an illustration of exemplary intra prediction directions.
Figure 1C:
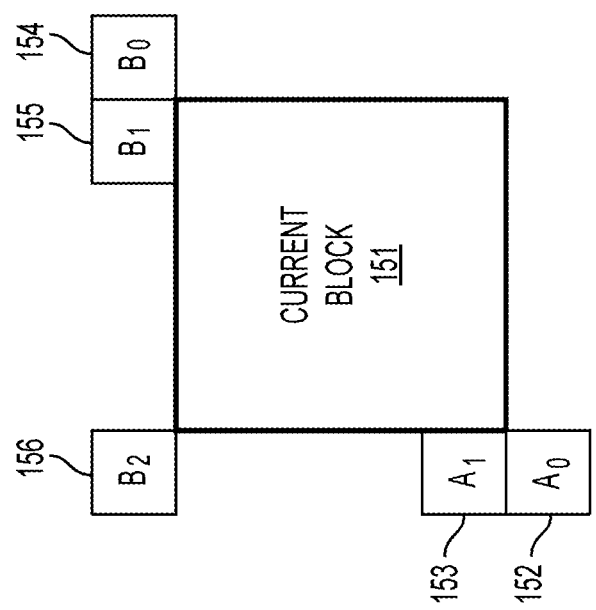
FIG. 1C is a schematic illustration of a current block and its surrounding spatial merge candidates in one example.
Figure 2:
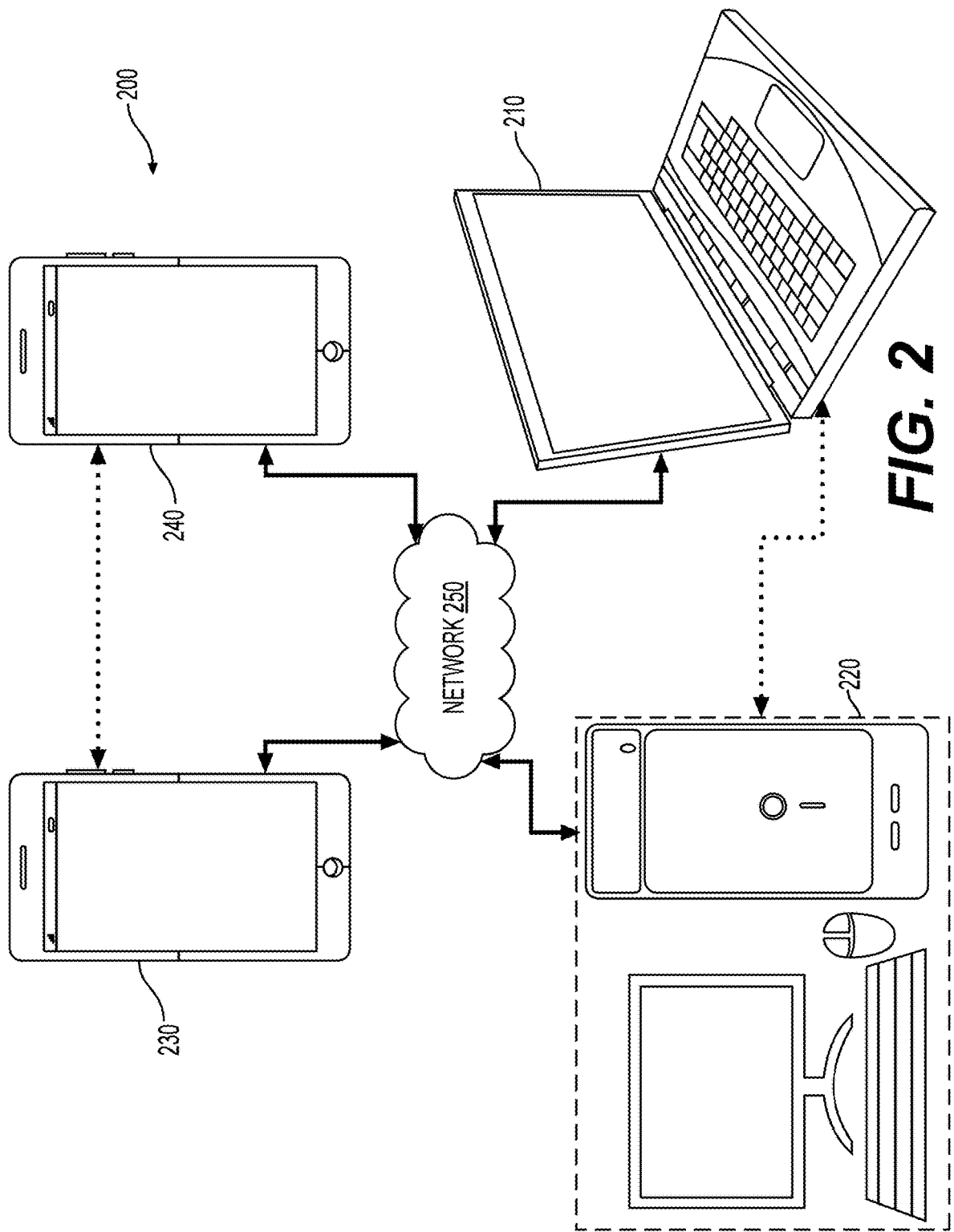
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
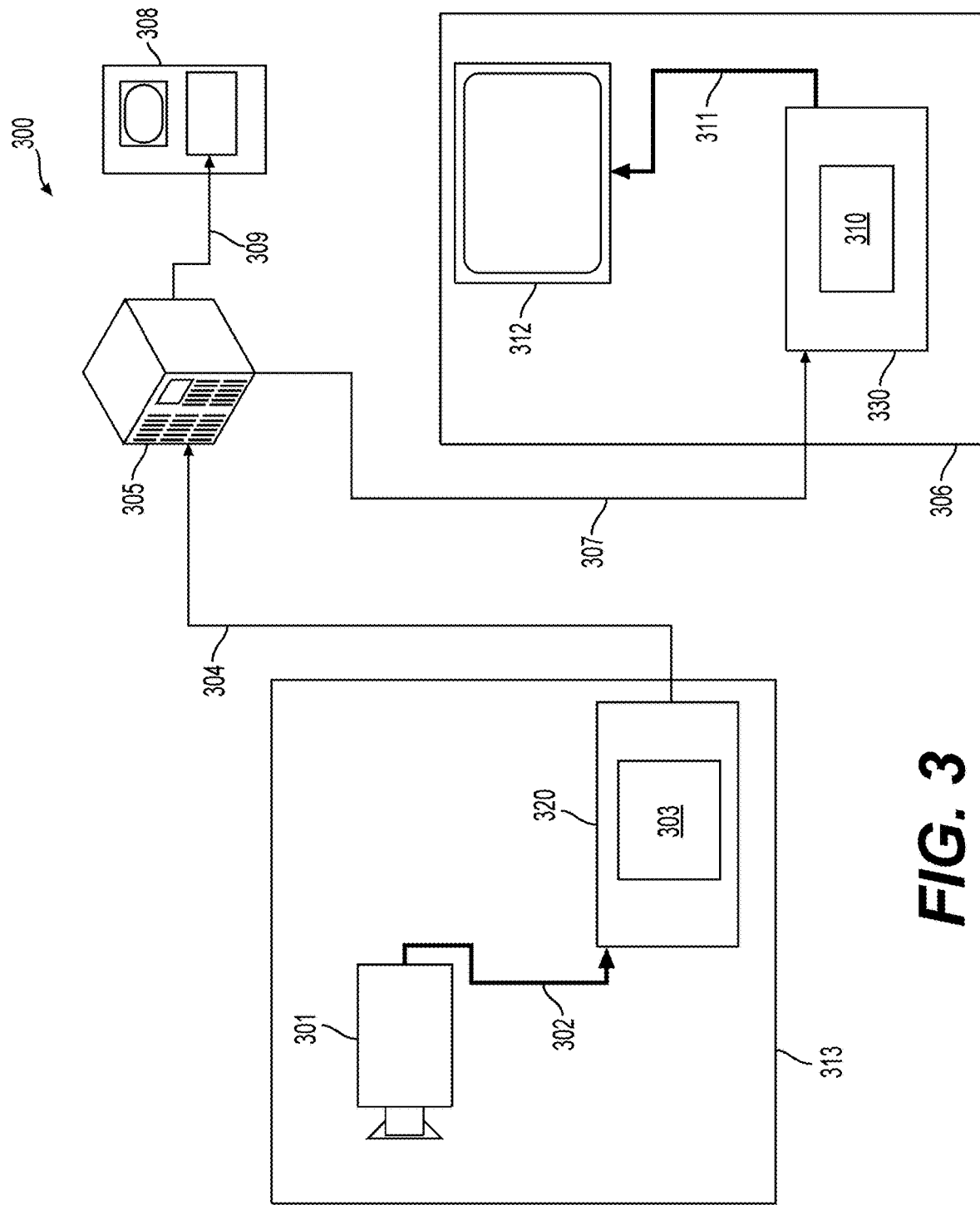
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
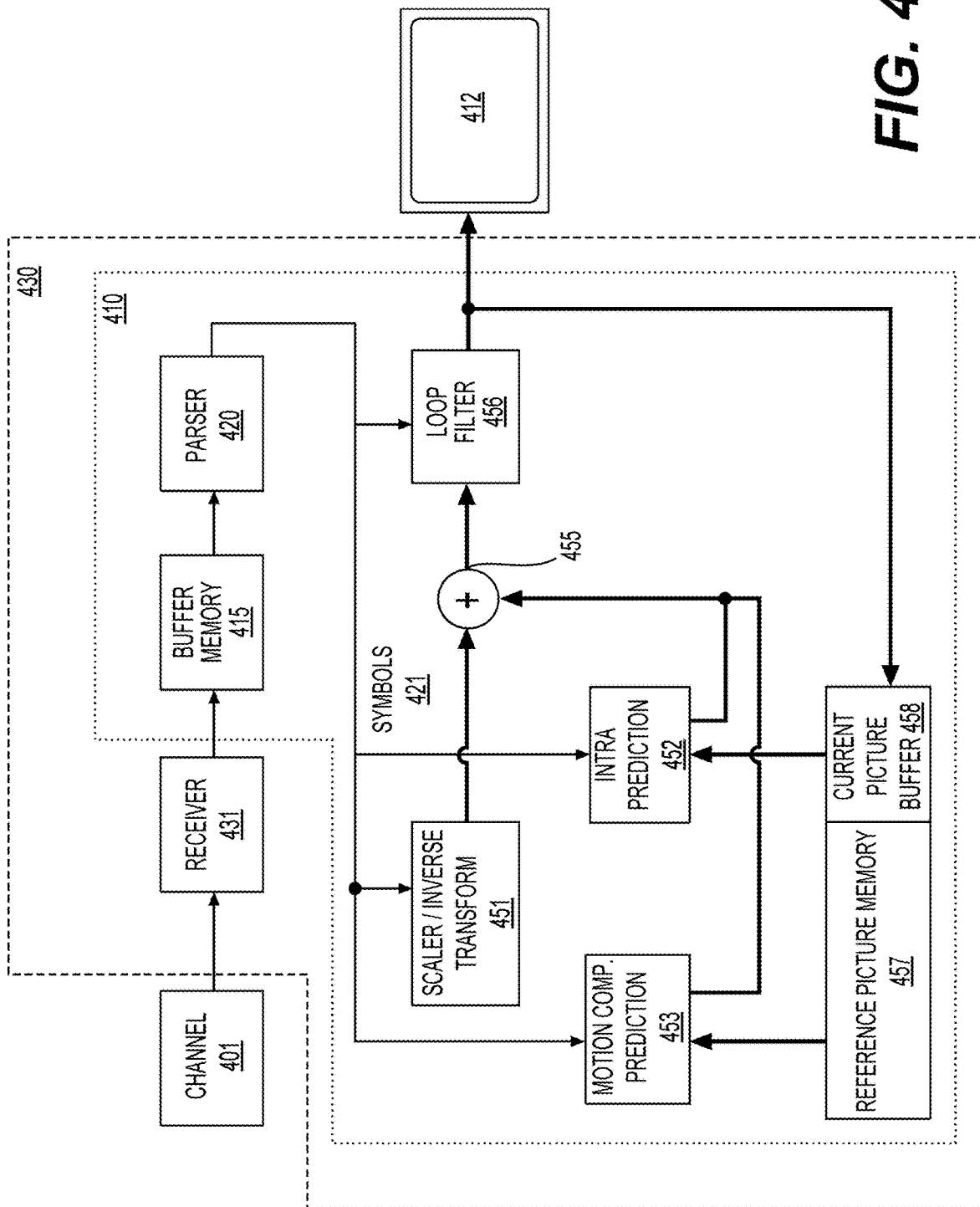
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
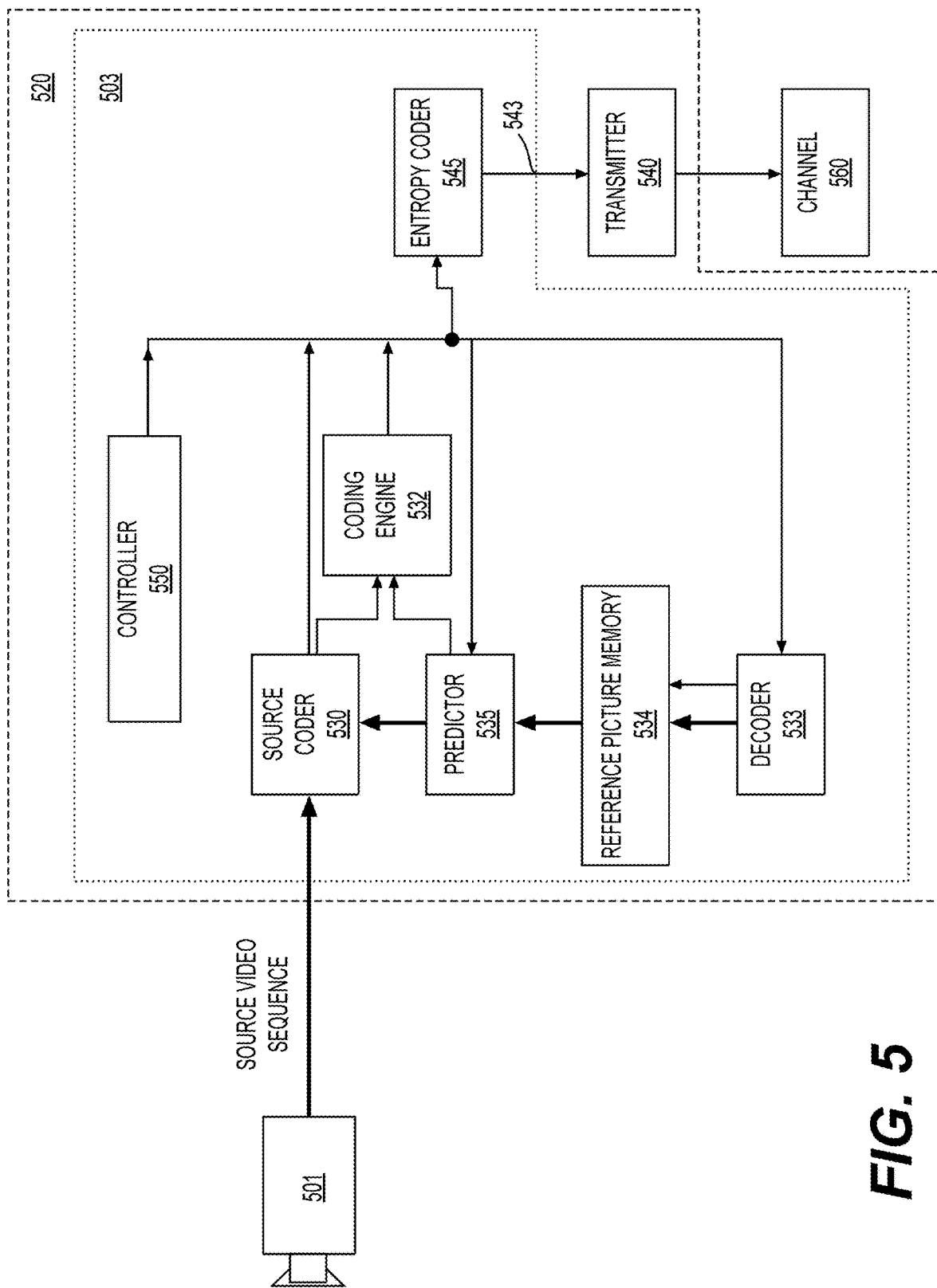
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
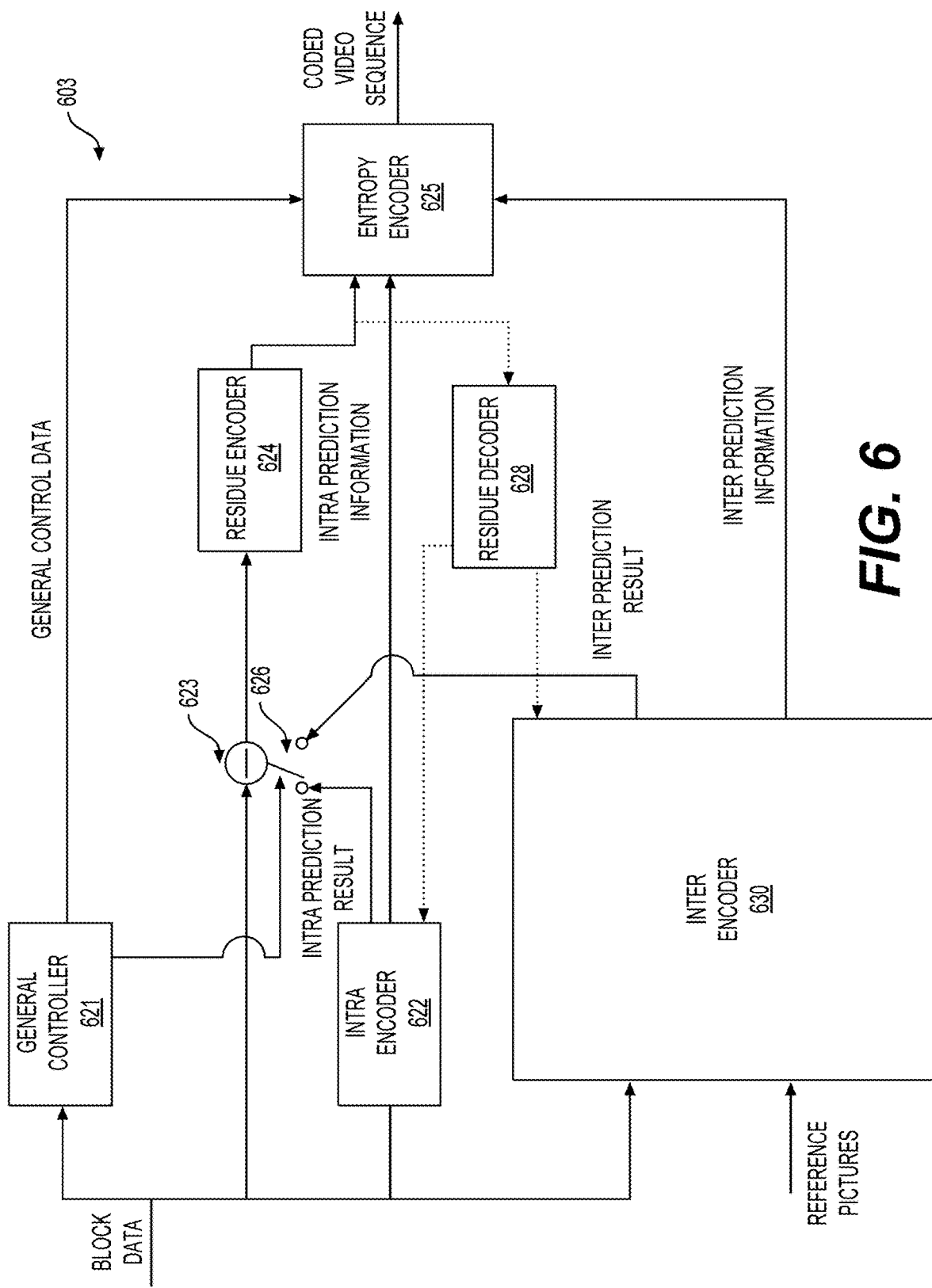
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603)

includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
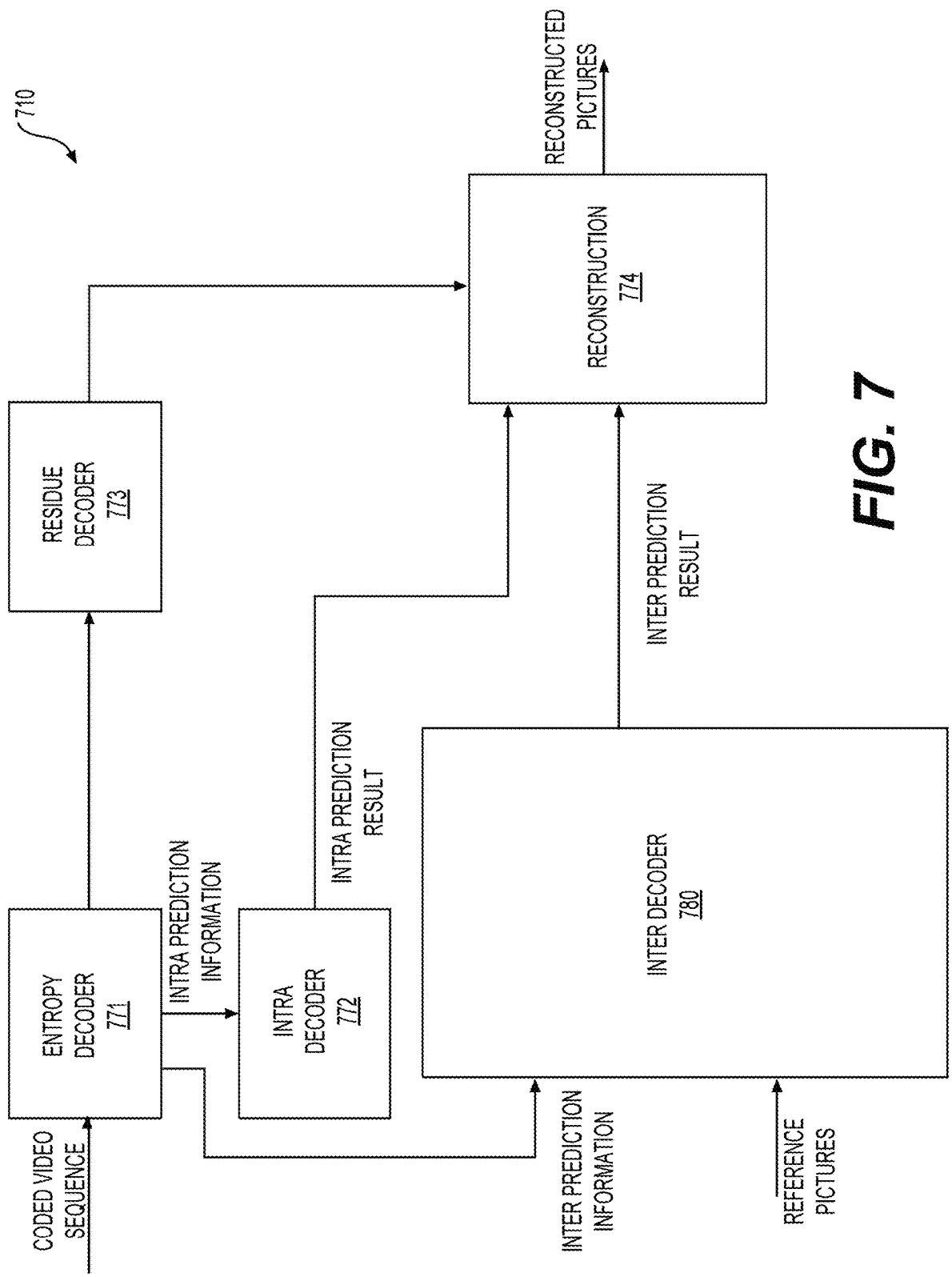
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for default block vector prediction for intra picture block compensation and default motion vector prediction for inter prediction.

Block based compensation can be used for inter prediction and intra prediction. For inter prediction, block based compensation from a different picture is known as motion compensation. Block based compensation can also be performed from a previously reconstructed area within the same picture, such as in intra prediction. The block based compensation from a reconstructed area within the same picture is referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can have any value (positive or negative, at either an x or a y direction), a BV is subject to a few constraints to ensure that the reference block is available and already reconstructed. Also, in some examples, for parallel processing consideration, some reference areas such as tile boundary, slice boundary, or wavefront ladder shape boundary can be excluded.

The coding of a block vector could be either explicit or implicit. In the explicit mode, a BV difference between a block vector and its predictor is signaled, for example, similar to the advanced motion vector prediction (AMVP) mode in inter coding. In the implicit mode, the block vector is recovered from a predictor (referred to as block vector predictor) without using the BV difference, in a similar way as a motion vector in merge mode. The resolution of a block vector, in some implementations, is restricted to integer positions. In other systems, the block vector is allowed to point to fractional positions.

In some examples, the use of intra block copy at a block level can be signaled using a block level flag, such as an IBC flag. In an embodiment, the block level flag is signaled when the current block is coded explicitly. In some examples, the use of intra block copy at a block level can be signaled using a reference index approach. The current picture under decoding can be treated as a reference picture or a special reference picture. In an example, such a reference picture is placed in the last position of a list of reference pictures. The special reference picture is also managed together with other temporal reference pictures in a buffer, such as a decoded picture buffer (DPB).

Variations of intra block copy can also be utilized, such as flipped intra block copy (the reference block is flipped horizontally or vertically before used to predict a current block), or line based intra block copy (each compensation unit inside an M×N coding block is an M×1 or 1×N line).

A BV of a current block under reconstruction in a picture can have certain constraints, and thus, a reference block for the current block can be limited to be within a search range.

In an example, the BV is a two-dimensional vector including an x and a y component, and at least one of the x and y components can be constrained. The search range can refer to a part of the picture from which the reference block can be selected. For example, the search range may be within certain portions of a reconstructed area in the picture.

Figure 8:
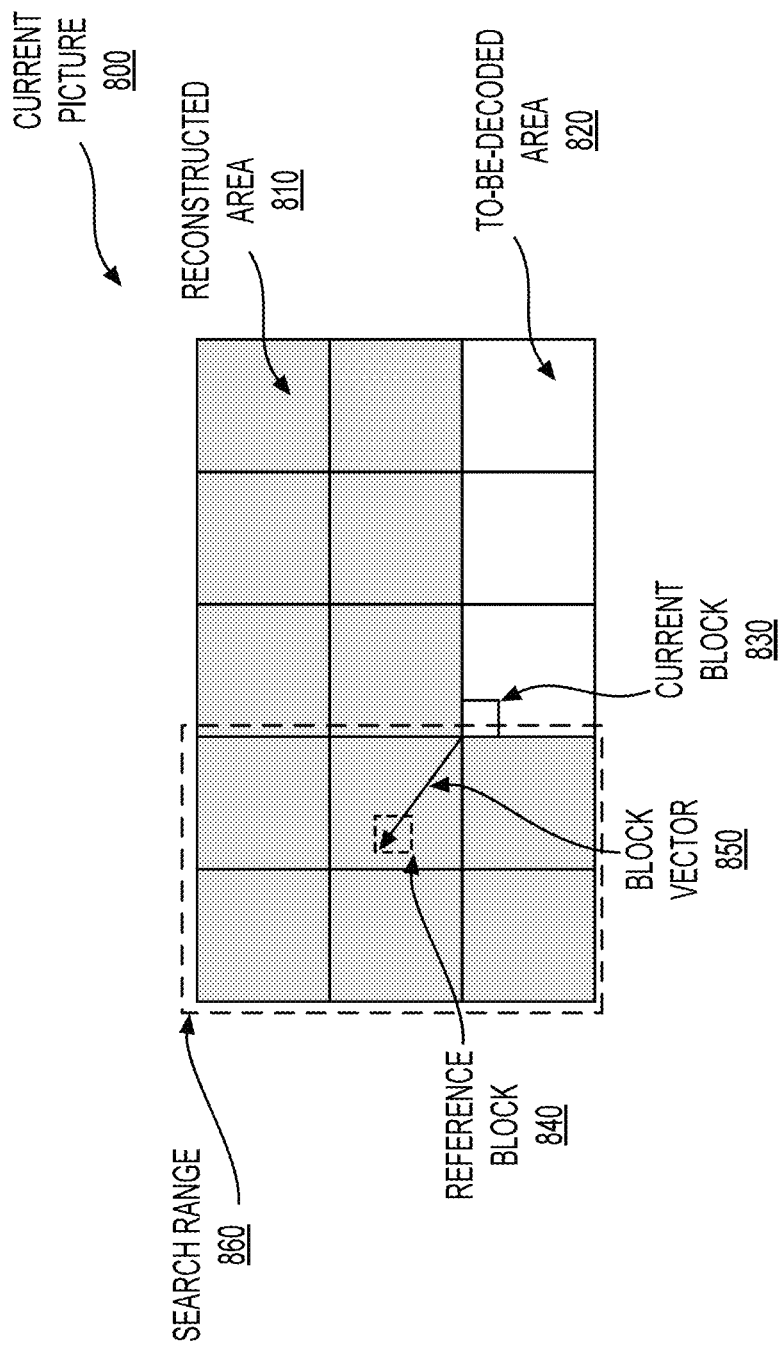
FIG. 8 shows an example of intra block copy according to an embodiment of the disclosure.

FIG. 8 shows an example of intra block copy according to an embodiment of the disclosure. A current picture (800) is to be reconstructed under decoding. The current picture (800) includes a reconstructed area (810) (grey area) and a to-be-decoded area (820) (white area). A current block (830) is under reconstruction by a decoder. The current block (830) can be reconstructed from a reference block (840) that is in the reconstructed area (810). A position offset between the reference block (840) and the current block (830) is referred to as a block vector (850) (or BV (850)). In an example as shown in FIG. 8, a search range (860) is located within the reconstructed area (810), the reference block (840) is within the search range (860), and the block vector (850) points to the reference block (840) within the search range (860). A block vector for the current block (830) is constrained to point to a reference block within the search range (860).

Various constraints can be applied to a BV and/or a search range. In an embodiment, a search range for a current block under reconstruction in a current CTB is constrained to be within the current CTB.

In an embodiment, an effective memory requirement to store reference samples to be used in intra block copy is one CTB size. In an example, the CTB size is 128×128 samples. A current CTB includes a current region under reconstruction. The current region has a size of 64×64 samples. Since a reference memory also stores reconstructed samples in the current region, the reference memory can store 3 more regions of 64×64 samples when a reference memory size is equal to the CTB size of 128×128 samples. Accordingly, a search range can include certain parts of a previously reconstructed CTB while a total memory requirement for storing reference samples is unchanged (such as 1 CTB size of 128×128 samples or four 64×64 reference samples in total).

FIGS. 9A-9D show examples of intra block copy according to an embodiment of the disclosure. Referring to FIGS. 9A-9D, a current picture (901) includes a current CTB (915) under reconstruction and a previously reconstructed CTB (910) that is a left neighbor of the current CTB (915). CTBs in the current picture (901) have a CTB size and a CTB width. The current CTB (915) includes 4 regions (916)-(919). Similarly, the previously reconstructed CTB (910) includes 4 regions (911)-(914). In an embodiment, the CTB size is equal to a reference memory size. For example, the CTB size and the reference memory size are 128×128 samples, and thus, each of the regions (911)-(914) and (916)-(919) has a size of 64×64 samples.

Figure 9A:
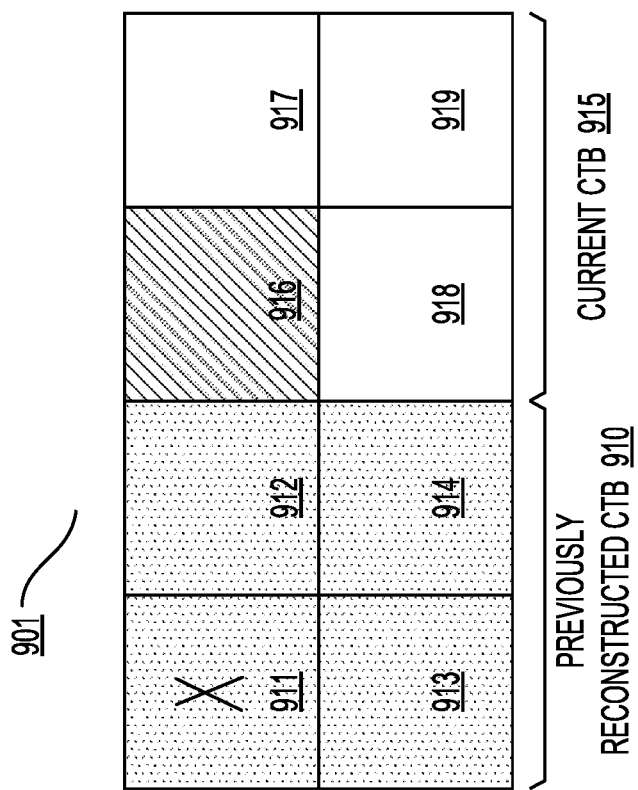
FIGS. 9A-9D show examples of intra block copy according to an embodiment of the disclosure.

Referring to FIG. 9A, the current region (916) including a current block is under reconstruction. According to some embodiments, a search range for the current block excludes the collocated region (911) of the current region (916) and includes the regions (912)-(914) of the previously reconstructed CTB (910).

Figure 9B:
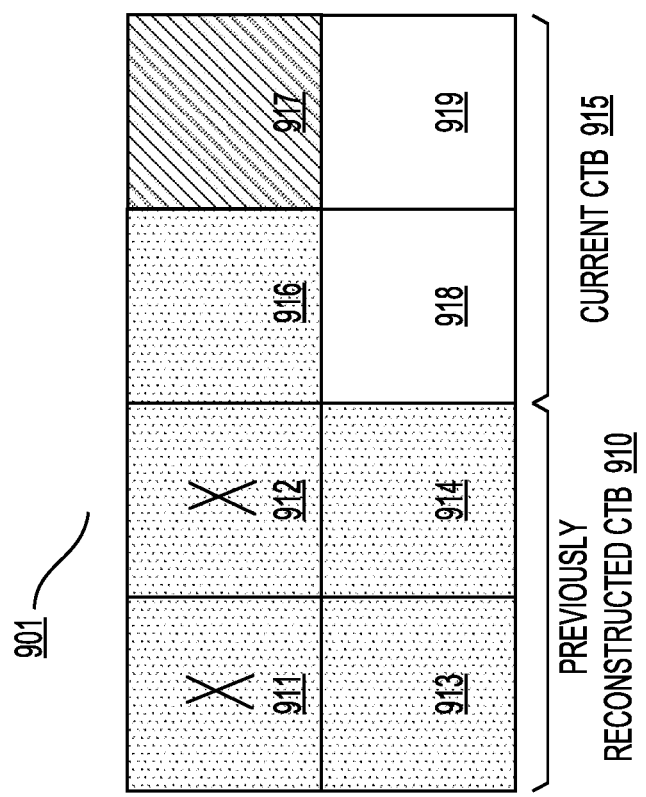

Referring to FIG. 9B, the current region (917) is under reconstruction. The current region (917) includes a current block. The current region (917) has a collocated region (i.e., the region (912) in the previously reconstructed CTB (910)). A search range for the current block excludes the collocated region (912). The search range includes the regions (913)-(914) of the previously reconstructed CTB (910) and the region (916) in the current CTB (915). The search range further excludes the region (911) due to the constraint of the reference memory size (i.e., one CTB size).

Figure 9C:
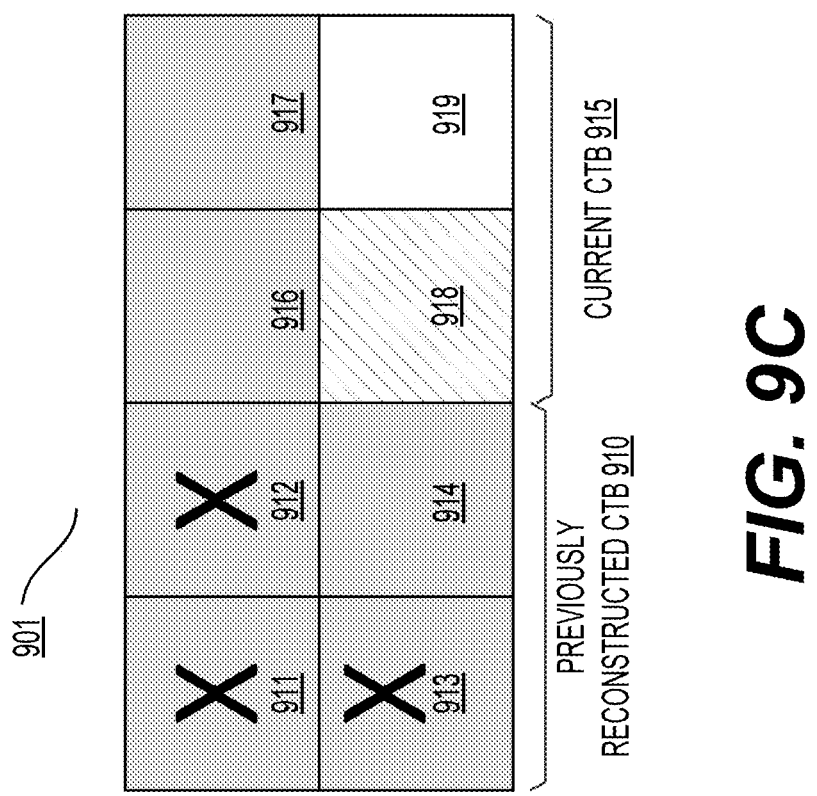

Referring to FIG. 9C, the current region (918) is under reconstruction. The current region (918) includes a current block to be reconstructed. The current region (918) has a collocated region (i.e., the region (913)) in the previously reconstructed CTB (910). A search range for the current block excludes the collocated region (913). The search range includes the region (914) of the previously reconstructed CTB (910) and the regions (916)-(917) in the current CTB (915). Similarly, the search range further excludes the regions (911)-(912) due to the constraint of the reference memory size.

Figure 9D:
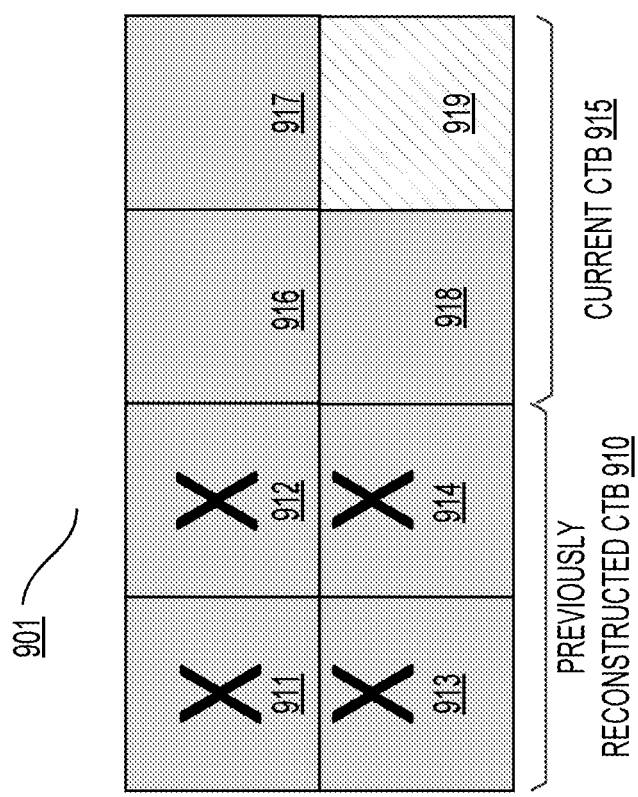

Referring to FIG. 9D, the current region (919) including a current block is under reconstruction. The current region (919) has a collocated region (i.e., the region (914)) in the previously reconstructed CTB (910). A search range for the current block excludes the collocated region (914). The search range includes the regions (916)-(918) in the current CTB (915). The search range excludes the regions (911)-(913) due to the constraint of the reference memory size, and thus, the search range excludes the previously reconstructed CTB (910).

In an example, when a search range is restrained in intra block copy, a BV of a current block is bounded by a current CTB boundary, by a left neighbor CTB boundary, or the like, depending on a position of a current block and the memory size.

In some examples, such as in inter prediction using motion vectors, a motion vector or a motion vector predictor can be determined from a candidate list for a current block. The candidate list can be a merge candidate list used in a merge mode, an AMVP candidate list used in an AMVP mode, or the like. When there are not enough candidates in the candidate list, a vector (0, 0) (also referred to as a default vector) can be used to fill the candidate list. However, the vector (0, 0) is not valid to perform intra block copy compensation. Accordingly, for intra block copy mode using a block vector or a block vector predictor, when there are not enough candidate(s) in the candidate list, default vector(s) other than the vector (0, 0) can be used to fill the candidate list.

In various examples, a block can refer to a prediction block (PB), a coding block (CB), a CU, or the like. Similar to a merge mode or a skip mode in inter prediction, intra block copy can be implemented by using a BV predictor as a merge/skip mode candidate, and thus a BV can be obtained from the BV predictor and a BV difference (or BV difference vector) between the BV and the BV predictor is not signaled and can be zero. Alternatively, a BV can be obtained from a BV predictor and a BV difference where the BV difference can be coded and transmitted in a coded video bitstream. Methods and an apparatus described in the disclosure can be applied to a MV used in the inter prediction or a BV used in the IBC mode.

In general, a current picture includes a current region under reconstruction. The current region can be a slice, a tile, a tile group, or the like. The current region can also be the entire current picture. The current region can include a plurality of blocks where one of the plurality of blocks is a current block under reconstruction. The current block can be reconstructed based on a prediction mode, such as an inter prediction mode, an intra block copy (IBC) mode, or the like. When the prediction mode is the inter prediction mode, a MV can be used to reconstruct the current block. When the prediction mode is the IBC mode, a BV can be used to reconstruct the current block. In the disclosure, a vector can refer to a MV used in the inter prediction mode or a BV used in the IBC mode.

When reconstructing the current block using the prediction mode, such as the inter prediction mode or the IBC mode, a candidate list for the current block can be determined. The candidate list can be a merge candidate list, an AMVP candidate list, or the like. Candidate(s) in the candidate list can be obtained from spatial neighbor(s) of the current block, previously decoded blocks, and/or the like. Candidate(s) can also be obtained from temporal neighbor(s) of the current block, for example, in the inter prediction mode. In an example, the prediction mode is the IBC mode, and the candidate(s) can be BV predictor(s).

In an example, when a number of candidate(s) in the candidate list is less than a threshold, one or more vectors can be added to the candidate list so that the number of candidate(s) can reach the threshold (e.g., the number of candidate(s) is equal to or larger than the threshold). In an example, when the candidate list is not full, the one or more vectors can be added to the candidate list to fill the candidate list. According to aspects of the disclosure, the one or more vectors can be obtained from a first set of default vectors for the current region, such as a slice, a tile, a tile group, the current picture, or the like. For example, the one or more vectors are a subset of the first set of default vectors. Accordingly, a single set, i.e., the first set of default vectors (also referred to as offsets) can be used when reconstructing the plurality of blocks in the current region. For example, the current region includes a first block and a second block. The first set of default vectors can be used when adding vector(s) to a first candidate list for the first block to fill the candidate list. The first set of default vectors can also be used when adding vector(s) to a second candidate list for the second block to fill the second candidate list. First prediction information for the current region indicating the first set of default vectors can be signaled in a header of the current region, such as a slice header, a tile header, a tile group header, a picture header, or the like, and thus reducing signaling overhead. Second prediction information for the current block can indicate the prediction mode.

According to an aspect of the disclosure, the first prediction information includes the first set of default vectors. The first set of default vectors can be signaled in a header of the current region. For example, the first set of default vectors can include six vectors: (−4, 0), (0, −4), (0, −8), (0, −12), (0, −16), and (0, −18), and the current region is a tile group (or a current tile group) including the plurality of coding blocks. Accordingly, the six vectors can be signaled in a tile group header (or at a current tile group level) and can be used as default BV predictors or MV predictors for the plurality coding blocks in the current tile group, such as in the merge mode or the AMVP mode. When the current block is predicted in the IBC mode, one or more, such as (−4, 0) and (0, −8), of the six vectors can be added to the candidate list of the current block, for example, to fill the candidate list.

According to an aspect of the disclosure, the first prediction information includes indices pointing to first vectors in a set of vectors that is available to an encoder and a decoder. In an example, the set of vectors is not signaled. The indices pointing to the first vectors can be signaled in a header of the current region. The first vectors can be determined to be the first set of default vectors. The first vectors can be a subset of the set of vectors. In an example, a number (i.e., a total number) of the first vectors can be signaled, for example, in the header of the current region. Alternatively, the number of the first vectors can be determined (e.g., pre-determined) by the encoder and decoder and thus is not signaled. The number of the first vectors can also be derived, for example, from a number of indices signaled, and thus is not signaled. For example, the set of vectors includes six vectors: (−4, 0), (0, −4), (0, −8), (0, −12), (0, −16), and (0, −18) and is known by the encoder and decoder (e.g., either preprogrammed or previously provided). When indices 0 and 2 are signaled, the first vectors include (−4, 0) and (0, −8) that are indicated by the indices 0 and 2, and thus the first set of default vectors includes (−4, 0) and (0, −8) and can be used to construct candidate lists for the plurality of coding blocks in the current region, such as a current tile group. In an example, the number of the first vectors, i.e., 2, is signaled to indicate that the number of the first set of default vectors used by the current tile group is 2.

According to an aspect of the disclosure, an updating process can be used for the current region. For the current region, a previous set of default vectors (also referred to as a second set of default vectors) can be obtained from a previously coded region, such as a previous header of the previously coded region. In an encoding process, the previously coded region can be a previously encoded region that is encoded prior to the current region in an encoding order. In a decoding process, the previously coded region can be a previously decoded region or a previously reconstructed region that is reconstructed prior to the current region in a decoding order. The first set of default vectors for the current region can be determined based on the second set of default vectors and the first prediction information. For example, the previous set of default vectors can be inherited from the previous header, with additional signaling to indicate which one(s) of the previous set of default vectors can be replaced by one or more new vectors. For the current region, such as the current tile group, a number of previous default vectors to be replaced (or updated) in the previous set of default vectors can be signaled or inferred. Further, one or more indices of the previous default vectors to be replaced and the one or more new vectors can be signaled in the header of the current region. The one or more indices and the one or more new vectors can be signaled after the number of previous default vectors to be replaced is signaled. The one or more indices can indicate which previous default vector(s) can be replaced in the previous set of default vectors.

For example, the previous set of default vectors: (−4, 0), (0, −4), (0, −8), (0, −12), (0, −16), and (0, −18) is inherited from the previous header of the previously reconstructed region. For the current region, a number 2 is signaled to indicate two of the previous set of default vectors are to be replaced or updated. Indices 0 and 2 are signaled to indicate the previous default vectors (−4, 0) and (0, −8), i.e., the $0^{th}$ and $2^{nd}$ previous default vectors in the previous set of default vectors are to be replaced. Two vectors (0, −5) and (−5, 0) are signaled as the new vectors to replace (−4, 0) and (0, −8). Accordingly, the first set of default vectors is (0, −5), (0, −4), (−5, 0), (0, −12), (0, −16), and (0, −18) where the $0^{th}$ and $2^{nd}$ vectors in the previous set of default vectors are replaced by the new vectors (0, −5) and (−5, 0), respectively, to form the first set of default vectors for the current region.

According to an aspect of the disclosure, a set of vectors is available to an encoder and a decoder, and used to generate a new set of vectors for the current region. The set of vectors are already known by both the encoder and decoder and need not be signaled. For the current region, previous default vectors for the previously coded region can be inherited from the previous header or another default vector list. Further, one or more replacement or new vectors to be used to generate the new set of vectors can be signaled.

The one or more replacement vectors and any inherited default vectors can be used to jointly form a new set of vectors. Additional signaling can indicate (i) which of the previous default vectors are to be inherited and/or (ii) whether one or more replacement or new vectors is to be added.

For example, the set of vectors includes (−4, 0), (0, −4), (0, −8), (0, −12), (0, −16), and (0, −18). The previous vectors indicated by indices 0 and 2 can be indicated as being inherited from the previous header, such as a previous header of a previous tile group or another default set of vectors. For example, in some embodiments, the number (e.g., 2) of vectors to be inherited can be signaled in the header of the current region. The indices 0 and 2 can be signaled to indicate which of the vectors (e.g., vectors (−4, 0) and (0, −8)) are to be inherited. Further, replacement or new vectors (e.g., vectors (0, −4) and (0, −12)) can be signaled as new vectors. The new vectors can be signaled with corresponding indices (e.g., indices 1 and 3) in some embodiments. Accordingly, a new set of vectors (i.e., the first set of default vectors) for the current region, for example including vectors (−4, 0) (0, −4), (0, −8), and (0, −12), can be formed.

In some embodiments, the candidate list for the current block includes one or more candidates that, for example, are available from one or more neighboring blocks of the current block. When the candidate list is not full, a set of offset vectors (also referred to as delta offsets) can be applied to one or more of the candidates to fill up the candidate list. A candidate from the candidate list can be selected for the current block as a base vector. In an example, the IBC mode is used, and the candidate for a BV predictor is referred to as BV_base (BV0$x$, BV0$y$) where BV0$x$ and BV0$y$ are x and y components of the BV predictor. An offset vector, such as BV_offset (BVoffsetx, BVoffsety), can be selected from the set of offset vectors. Subsequently, a vector can be determined based on the base vector and the offset vector. For example, the vector (e.g., a new BV predictor BV_new) is determined from the base vector (e.g., BV_base) and the offset vector (e.g., BV_offset) as a summation of the base vector and the offset vector. Accordingly, BV_new=BV_base+BV_offset=(BV0$x$+BVoffsetx, BV0$y$+BVoffsety), and thus the vector (e.g., the new BV predictor BV_new) used to fill up the candidate list is BV_new= (BV0$x$+BVoffsetx, BV0$y$+BVoffsety).

Various methods can be used to determine the set of offset vectors. In an embodiment, the set of offset vectors includes vectors (+1, 0), (−1, 0), (0, +1), and (0, −1). In an embodiment, the set of offset vectors includes vectors (+2, 0), (−2, 0), (0, +2), and (0, −2). The set of offset vectors can be available to a decoder, such as stored in the decoder. Offset vector sets with different numbers of offset vectors and values can be utilized in other examples. Further, in some embodiments, only a single numerical value for the offset may need to be signaled or stored. For example, the exemplary sets of offset vectors can be determined from a numerical value of 1 or 2.

Any suitable order or priority can be used to select one or more offset vectors from the set of offset vectors. For example, in the IBC mode, the vectors (−1, 0) and (0, −1) can have a higher priority than (+1, 0) and (0, +1), and the order can be (−1, 0), (0, −1), (+1, 0), and (0, +1). In an example, such as in the inter prediction mode, a different priority or order can be used, such as an order of (+1, 0), (−1, 0), (0, +1), and (0, −1).

As described above, a vector from the first set of the default vectors can be added to the candidate list for the current block, for example, to increase the number of candidates in the candidate list or to fill the candidate list. Accordingly to an aspect of the disclosure, the vector can be added behind the existing candidates in the candidate list, i.e., the vector can be added as a last entry in the candidate list. The candidate list can be derived from one or more previously reconstructed blocks. In an example, the candidate list includes BV predictors from the one or more previously IBC coded blocks.

In an example, the vector is placed after all the existing candidates in the candidate list, regardless whether any of the existing candidates in the candidate list is a valid predictor or not. In an example, when the prediction mode is the IBC mode, the valid predictor can refer to a BV predictor pointing to a valid and available reference block in the current picture. For example, a reference block indicated by the BV predictor is located within a search range.

In an example, the vector is placed after all the existing candidates in the candidate list. When one or more of the existing candidates in the candidate list are not valid, the one or more invalid candidates (or the one or more of the existing candidates) are removed or pruned from the candidate list, and thus the vector can move up in the candidate list. The vector is added as the last entry in the candidate list, however, a number of the candidates in the pruned candidate list is reduced by removing the one or more invalid candidates.

In an example, the prediction mode is the IBC mode, the vector can be a BV, and can be added to the candidate list as a BV predictor for the current block. In an example, the prediction mode is the inter prediction mode, the vector can be a MV, and can be added to the candidate list as a MV predictor for the current block. At least one sample in the current block can be reconstructed based on the candidate list after the vector is added to the candidate list.

Figure 10:
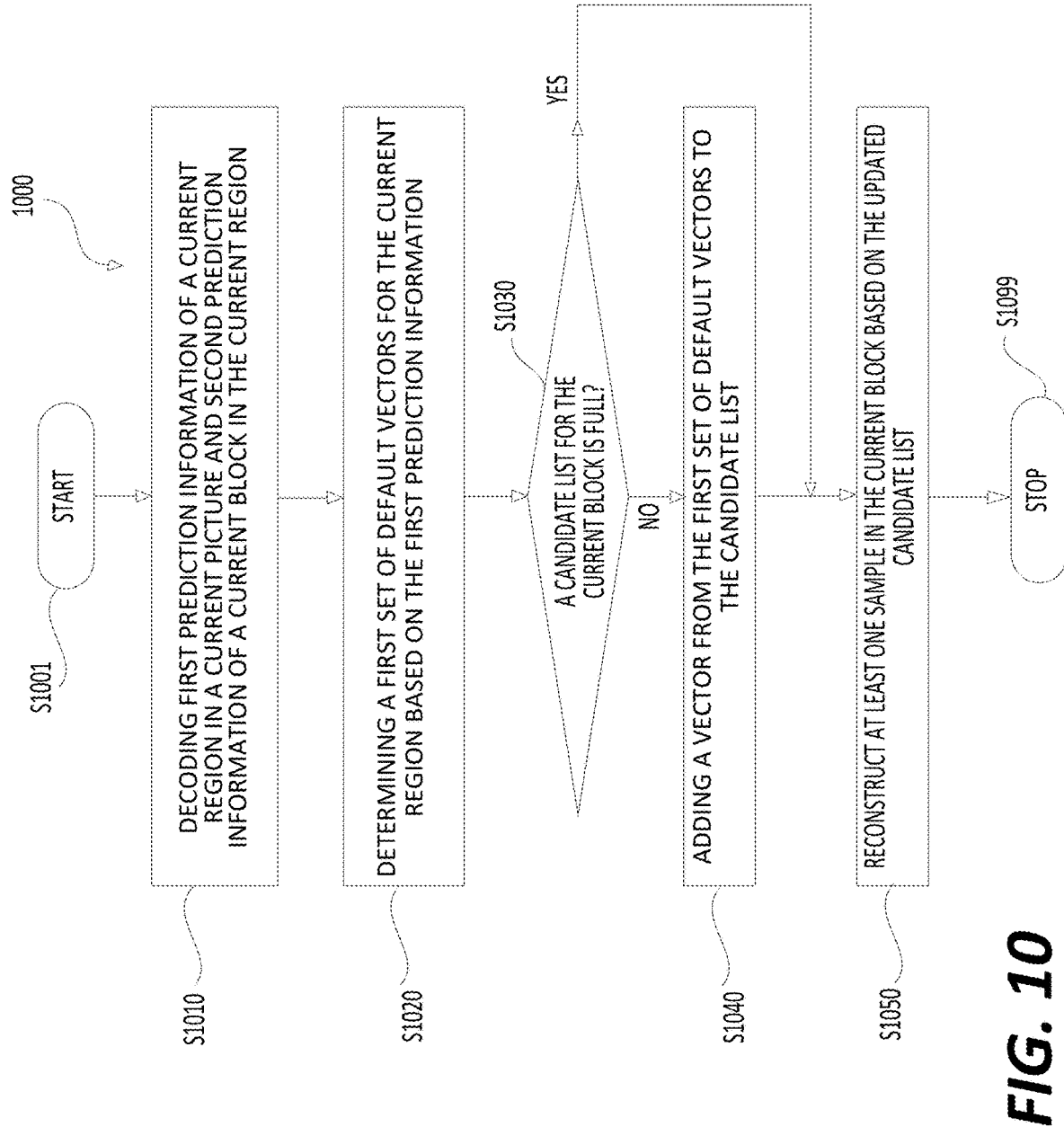
FIG. 10 shows a flow chart outlining a process (1000) according to an embodiment of the disclosure.

FIG. 10 shows a flow chart outlining a process (1000) according to an embodiment of the disclosure. The process (1000) can be used in the reconstruction of a block coded in, for example, the inter prediction mode, the IBC mode, or the like, so to generate a prediction block for the block under reconstruction. In various embodiments, the process (1000) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1000) is implemented in software instructions, thus when the processing circuitry executes the software instructions, the processing circuitry performs the process (1000). The process (1000) starts at (S1001) and proceeds to (S1010).

At (S1010), first prediction information of a current region in a current picture can be decoded from a coded video bitstream. The current region can include a plurality of blocks (or coding blocks) including a current block. The first prediction information of the current region can be signaled in a header of the current region. Second prediction information of the current block can be decoded from the coded video bitstream. The second prediction information can indicate that a prediction mode for reconstructing the current block is one of: the inter prediction mode and the IBC mode. As described above, the current region can be a slice, a tile, a tile group, the current picture, or the like.

At (S1020), a first set of default vectors for the current region can be determined based on the first prediction information, for example, using various methods described above. In some examples, the first set of default vectors is signaled directly in the header of the current region. In some examples, a set of default vectors is available to the decoder, and the first set of default vectors is a subset of the set of default vectors. Indices pointing to first vectors in the set of default vectors can be signaled in the header of the current region, and the first set of default vectors includes the first vectors. In some examples, various update processes as described above can be used to determine the first set of default vectors from a previous set of default vectors for a previously reconstructed region.

When the current region is a first region to be decoded, no previously reconstructed region is available, and thus the first set of default vectors or indices indicating the first set of default vectors can be signaled in the header for the current region. When a previously reconstructed region is available, an update process based on a previous set of default vectors can be used.

At (S1030), whether a candidate list for the current block is full can be determined. In an example, the candidate list is determined to be full when a number of candidate(s) in the candidate list reaches a threshold (e.g., the number of candidate(s) is equal to or larger than the threshold). When the candidate list is determined to be full, the process (1000) proceeds to (S1050). Otherwise, when the candidate list is determined not to be full, the process (1000) proceeds to (S1040).

At (S1040), a vector from the first set of default vectors can be added to the candidate list for the current block. Any suitable vector from the first set of default vectors can be added to the candidate list. In some examples, multiple vectors from the first set of default vectors can be added to fill the candidate list. In an example, such as in the IBC mode, an additional step can be added to the process (1000) to determine whether the vector from the first set of default vectors is a valid vector (or available vector). For example, a reference block that the vector points to from the current block is located within an area that is already reconstructed in the current picture, and thus the reference block is available to reconstruct the current block. When the vector is determined to be valid, the vector can be added to the candidate list. Otherwise, the vector is not added to the candidate list.

In various examples, the vector can be added as the last entry in the candidate list, as described above. In an example, the candidate list can be pruned by removing invalid candidate(s), and subsequently, the vector can be added to the last entry in the pruned candidate list.

At (S1050), at least one sample in the current block can be reconstructed based on the updated candidate list. In an example, the IBC mode is used to reconstruct the current block. One candidate from the updated candidate list can be used as a BV predictor. Further, the BV predictor is used as a BV for the current block and a BV difference is not signaled and not used. The at least one sample in the current block can be reconstructed using the BV. The process (1000) proceeds to (S1099) and terminates.

The process (1000) can be suitably adapted by including additional step(s), omitting one or more steps, changing a sequence of implementing the steps in the process (1000), and/or the like.

Figure 11:
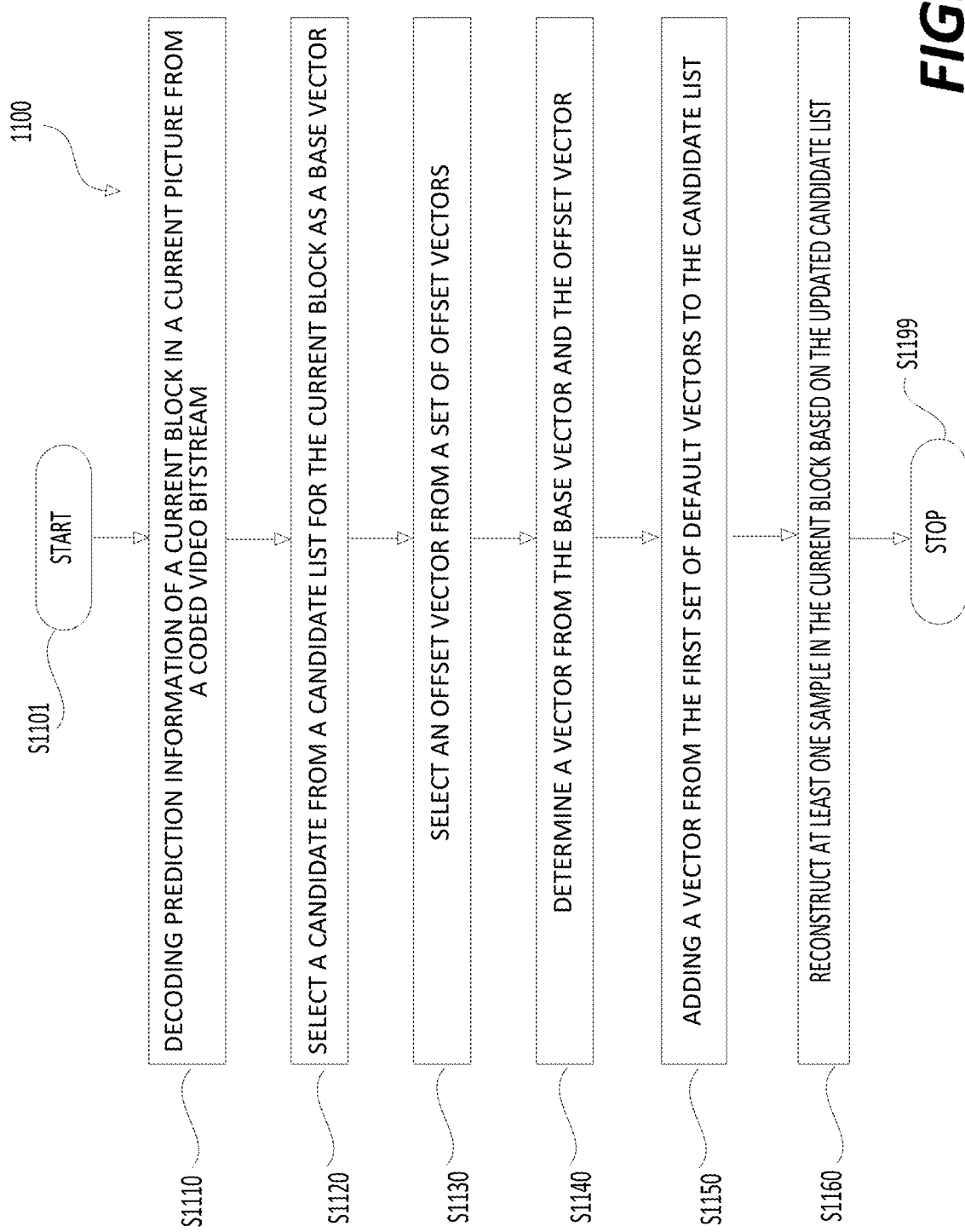
FIG. 11 shows a flow chart outlining a process (1100) according to an embodiment of the disclosure.

FIG. 11 shows a flow chart outlining a process (1100) according to an embodiment of the disclosure. The process (1100) can be used in the reconstruction of a block coded in, for example, the inter prediction mode, the IBC mode, or the like, so to generate a prediction block for the block under reconstruction. In various embodiments, the process (1100) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1100) is implemented in software instructions, thus when the processing circuitry executes the software instructions, the processing circuitry performs the process (1100). The process (1100) starts at (S1101) and proceeds to (S1110).

At (S1110), prediction information of a current block in a current picture can be decoded from a coded video bitstream. The prediction information can indicate that a prediction mode for reconstructing the current block is one of: the inter prediction mode and the IBC mode.

At (S1120), a candidate from a candidate list for the current block can be selected as a base vector.

At (S1130), an offset vector can be selected from a set of offset vectors. The set of offset vectors can be available to (e.g., signaled, previously received or pre-stored) at a decoder. In an example, the set of offset vectors includes (+1, 0), (−1, 0), (0, +1), and (0, −1). In an example, the set of offset vectors includes (+2, 0), (−2, 0), (0, +2), and (0, −2). Offset vector sets with different numbers of offset vectors and values can be utilized in other examples. Further, in some embodiments, only a single numerical value for the offset may need to be signaled or stored. For example, the exemplary sets of offset vectors can be determined from a numerical value of 1 or 2. Any suitable order or priority can be used to select the offset vectors from the set of offset vectors. For example, in the IBC mode, the vectors (−1, 0) and (0, −1) can have higher priority than (+1, 0) and (0, +1), and the order can be (−1, 0), (0, −1), (+1, 0), and (0, +1).

At (S1140), a vector can be determined from the base vector and the offset vector, for example, by summing the base vector and the offset vector.

At (S1150), the vector can be added to the candidate list. In an example, such as in the IBC mode, an additional step can be added to the process (1100) to determine whether the vector is a valid vector, as described above with reference to FIG. 10. When the vector is determined to be valid, the vector can be added to the candidate list. Otherwise, the vector is not added to the candidate list. In various examples, the vector can be added as the last entry in the candidate list, as described above.

At (S1160), at least one sample in the current block can be reconstructed based on the updated candidate list, similar to that described above with reference to FIG. 10, and thus detailed descriptions are omitted for purpose of brevity. The process (1100) proceeds to (S1199) and terminates.

The process (1100) can be suitably adapted by including additional step(s), omitting one or more steps, changing a sequence of implementing the steps in the process (1100), and/or the like. In some examples, a step can be added to determine whether the candidate list is full prior to (S1120). When the candidate list is determined to be full, the process (1100) proceeds to (S1199). Otherwise, the candidate list is determined not full, the process (1100) proceeds to (S1120).

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
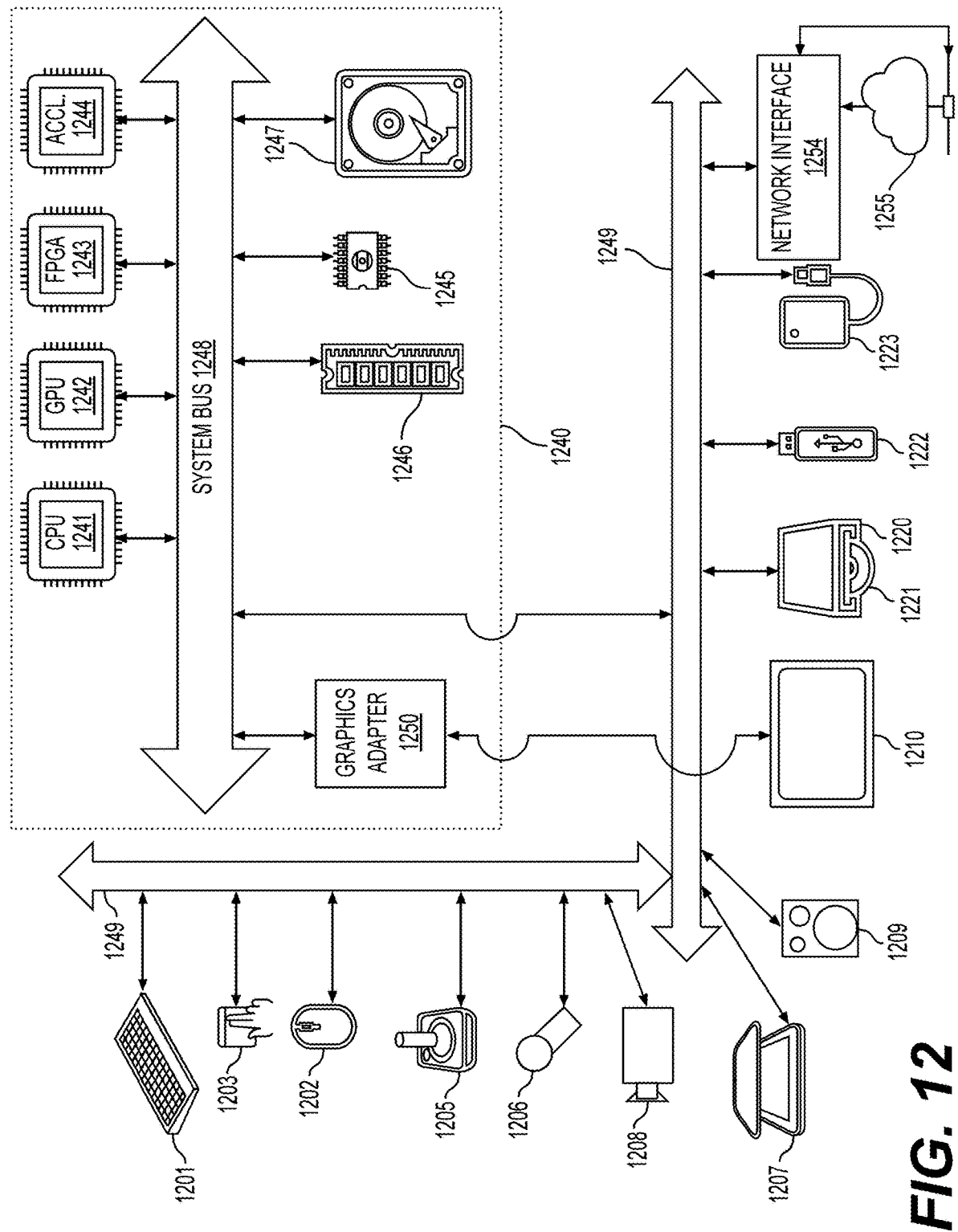
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding first prediction information of a current region in a current picture and second prediction information of a current block of plural blocks included in the current region from a coded video bitstream, the first prediction information indicating a first set of default vectors in a set of vectors such that individual candidate lists for each of two or more of the plural blocks of the current region are filled using the same first set of default vectors, and the second prediction information indicating that a prediction mode for reconstructing the current block is one of: an inter prediction mode and an intra block copy (IBC) mode, the first set of default vectors being different from a zero vector;
    in response to a determination that a number of candidates in a candidate list for the current block is less than a threshold, selecting one or more default vectors from the first set of default vectors indicated by the first prediction information of the current region in which the current block is located;
    adding the selected one or more default vectors from the first set of default vectors indicated by the first prediction information of the current region to the candidate list for the current block; and
    reconstructing at least one sample in the current block based on the candidate list including the selected one or more default vectors.

2. The method of claim 1, wherein
    the method further includes determining the number of candidates in the candidate list.

3. The method of claim 1, wherein
    the current region is one of: a slice, a tile, and a tile group; and
    the first prediction information is signaled in a header, the header being one of: a slice header, a tile header, and a tile group header.

4. The method of claim 1, wherein the first prediction information includes the first set of default vectors.

5. The method of claim 1, wherein
    the first prediction information includes indices pointing to first vectors in the set of vectors; and
    the method further includes determining the first vectors to be the first set of default vectors.

6. The method of claim 1, wherein
    the method includes obtaining a second set of default vectors for a previously reconstructed region; and
    the first set of default vectors for the current region further includes vectors determined based on the second set of default vectors and the first prediction information.

7. The method of claim 6, wherein
    the first prediction information includes at least one index and at least one new vector to replace at least one of the second set of default vectors, the at least one index indicating the at least one of the second set of default vectors to be replaced; and
    the method further includes:
        replacing the at least one of the second set of default vectors with the at least one new vector to form the vectors included in the first set of default vectors.

8. The method of claim 1, wherein the adding the selected one or more default vectors further comprises:
    adding the selected one or more default vectors from the first set of default vectors to a last entry in the candidate list.

9. The method of claim 1, wherein the adding the vector further comprises:
    prior to adding the selected one or more default vectors, determining whether at least one candidate in the candidate list is invalid for the current block;
    when the at least one candidate in the candidate list is determined to be invalid,
        removing the at least one candidate from the candidate list to prune the candidate list; and
        adding the selected one or more default vectors from the first set of default vectors to a last entry in the pruned candidate list.

10. The method of claim 1, wherein the selected one or more default vectors are block vectors and the prediction mode is the IBC mode.

11. A method for video decoding in a decoder, comprising:
    decoding prediction information of a current block in a current picture from a coded video bitstream, the prediction information indicating that a prediction mode for reconstructing the current block is one of: an inter prediction mode and an intra block copy (IBC) mode;
    selecting a candidate from a candidate list for the current block as a base vector;
    selecting, based on the decoded prediction information, an offset vector to be added to the base vector from a set of offset vectors, the set of offset vectors being one of: a first set of (+1, 0), (−1, 0), (0, +1), and (0, −1) or a second set of (+2, 0), (−2, 0), (0, +2), and (0, −2), the decoded prediction information signaling whether the first set or the second set is to be used as the set of offset vectors;
    adding the selected offset vector to the base vector to determine a vector;
    adding, to the candidate list, the vector generated by adding the base vector and the offset vector; and
    reconstructing at least one sample in the current block based on the candidate list after the vector is added to the candidate list.

12. An apparatus for video decoding, comprising processing circuitry configured to:
    decode first prediction information of a current region in a current picture and second prediction information of a current block of plural blocks included in the current region from a coded video bitstream, the first prediction information indicating a first set of default vectors in a set of vectors such that individual candidate lists for each of two or more of the plural blocks of the current region are filled using the same first set of default vectors, and the second prediction information indicating that a prediction mode for reconstructing the current block is one of: an inter prediction mode and an intra block copy (IBC) mode, the first set of default vectors being different from a zero vector;

in response to a determination that a number of candidates in a candidate list for the current block is less than a threshold, select one or more default vectors from the first set of default vectors indicated by the first prediction information of the current region in which the current block is located;

add the selected one or more default vectors from the first set of default vectors indicated by the first prediction information of the current region to the candidate list for the current block; and reconstruct at least one sample in the current block based on the candidate list including the selected one or more default vectors.

13. The apparatus of claim 12, wherein the processing circuitry is further configured to:
determine the number of candidates in the candidate list.

14. The apparatus of claim 12, wherein
the current region is one of: a slice, a tile, and a tile group; and
the first prediction information is signaled in a header, the header being one of: a slice header, a tile header, and a tile group header.

15. The apparatus of claim 12, the first prediction information includes the first set of default vectors.

16. The apparatus of claim 12, wherein
the first prediction information includes indices pointing to first vectors in the set of vectors; and
the processing circuitry is further configured to determine the first vectors to be the first set of default vectors.

17. The apparatus of claim 12, wherein
the processing circuitry is further configured to:
obtain a second set of default vectors for a previously reconstructed region; and
the first set of default vectors for the current region further includes vectors determined based on the second set of default vectors and the first prediction information.

18. The apparatus of claim 17, wherein
the first prediction information includes at least one index and at least one new vector to replace at least one of the second set of default vectors, the at least one index indicating the at least one of the second set of default vectors to be replaced; and
the processing circuitry is further configured to:
replace the at least one of the second set of default vectors with the at least one new vector to form the vectors included in the first set of default vectors.

19. The apparatus of claim 12, wherein the processing circuitry is further configured to:
add the selected one or more default vectors from the first set of default vectors to a last entry in the candidate list.

* * * * *